APPARATUS FOR EMBOSSING ALPHA-NUMERIC CHARACTERS

Filed July 18, 1968 11 Sheets-Sheet 1

INVENTORS
LOUIS M. BALLARD
WAYNE M. BEEBE
DAVID C. KRAMER
WALDO I. ROGERS
BY Watson, Cole, Grindle & Watson
ATTORNEYS Jan. 12, 1971 L. M. BALLARD ET AL 3,553,787

APPARATUS FOR EMBOSSING ALPHA-NUMERIC CHARACTERS

Filed July 18, 1968 11 Sheets-Sheet 2

INVENTORS,
LOUIS M. BALLARD
WAYNE M. BEEBE
DAVID C. KRAMER
WALDO I. ROGERS
BY Watson, Cole, Grindle & Watson
ATTORNEYS INVENTORS,
LOUIS M. BALLARD
WAYNE M. BEEBE
DAVID C. KRAMER
WALDO I. ROGERS
BY Watson, Cole, Grindle & Watson
ATTORNEYS

APPARATUS FOR EMBOSSING ALPHA-NUMERIC CHARACTERS

Filed July 18, 1968 11 Sheets-Sheet 4

INVENTORS,
LOUIS M. BALLARD
WAYNE M. BEEBE
DAVID C. KRAMER
WALDO I. ROGERS
BY Watson, Cole, Grindle & Watson
ATTORNEYS

APPARATUS FOR EMBOSSING ALPHA-NUMERIC CHARACTERS

INVENTORS,
LOUIS M. BALLARD
WAYNE M. BEEBE
DAVID C. KRAMER
WALDO I. ROGERS
BY Watson, Cole, Grindle & Watson
ATTORNEYS INVENTORS,
LOUIS M. BALLARD
WAYNE M. BEEBE
DAVID C. KRAMER
WALDO I. ROGERS
BY Watson, Cole, Grindle & Watson
ATTORNEYS INVENTORS,
LOUIS M. BALLARD
WAYNE M. BEEBE
DAVID C. KRAMER
WALDO I. ROGERS
BY Watson, Cole, Grindle & Watson
ATTORNEYS

APPARATUS FOR EMBOSSING ALPHA-NUMERIC CHARACTERS

Filed July 18, 1968

INVENTORS,
LOUIS M. BALLARD
WAYNE M. BEEBE
DAVID C. KRAMER
WALDO I. ROGERS
BY Watson, Cole, Grindle & Watson
ATTORNEYS INVENTORS,
LOUIS M. BALLARD
WAYNE M. BEEBE
DAVID C. KRAMER
WALDO I. ROGERS
BY Watson, Cole, Grindle & Watson
ATTORNEYS INVENTOR,
LOUIS M. BALLARD
WAYNE M. BEEBE
DAVID C. KRAMER
WALDO I. ROGERS
BY Watson, Cole, Grindle & Watson
ATTORNEYS

APPARATUS FOR EMBOSSING ALPHA-NUMERIC CHARACTERS

Filed July 18, 1968

INVENTOR,
LOUIS M. BALLARD
WAYNE M. BEEBE
DAVID C. KRAMER
WALDO I. ROGERS
BY Watson, Cole, Grindle & Watson
ATTORNEYS United States Patent Office 3,553,787

Patented Jan. 12, 1971

3,553,787

APPARATUS FOR EMBOSSING ALPHA-NUMERIC CHARACTERS

Louis M. Ballard, Arcadia, Wayne M. Beebe, Pasadena, David C. Kramer, Redondo Beach, and Waldo I. Rogers, Sierra Madre, Calif., assignors to Moore Business Forms, Inc., Niagara Falls, N.Y., a corporation of Delaware Filed July 18, 1968, Ser. No. 745,814

Int. Cl. B29f *1/00*

U.S. Cl. 18—30 27 Claims

ABSTRACT OF THE DISCLOSURE

The disclosure broadly relates to methods and apparatus for serially operating upon plastic sheets to provide sprue free, solid plastic alpha-numeric embossments adherent to the sheets, as for example plastic credit cards. Cards are sequentially transported to one or more embossment stations where relatively movable multiple dies are automatically selected in predetermined combinations to present peripheral recesses in the die members to the cards and inject heated plastic through the die members onto the cards to form the numeric or alphabetical embossments which are bonded to the cards. The embossed cards are then sequentially transported to another station where the embossments are cut to sever sprues and form imprinting surfaces with less deflection than conventional hollow embossments during document imprinting.

The method and apparatus according to this invention form numeric and alphabetic embossments on a card or sheet which can best be defined as relating to the techniques of injection molding. The numeric and alphabetical characters formed by the method and apparatus to be described hereinafter are embossments in the sense that they are raised in relief from the surface of the card or sheet material. Although the characters are referred to hereinafter as being "embossed" or "embossments," they are formed on the sheet surface by an injection molding process where heated plastic material is injected into character recesses and bonded to the surface of the sheet or card as opposed to an embossing process where the raised character is formed by a stamping die which forces the surface of the material to assume the desired shape. Thus, an embossing station in accordance with the description hereinafter, refers to a station where an embossment is formed on the surface of a card or sheet material by bonding an injection molded character to the surface of the card or sheet material.

The more specific aspects of the invention pertain to methods and apparatus wherein heated plastic material is delivered into the interiors of the relatively movable multiple dies for injection into selected peripheral recesses of the dies to form embossments adhering to a plastic card which is clamped against the recesses. Controls are provided to insure that the proper pressure and temperature is applied to the injected plastic and to interrupt the continuity of the plastic injection within the dies to insure proper die clean-out after each injection cycle.

This invention relates generally to the embossment of sheet material, and more particularly to apparatus and method for injecting solid numerical and alphabetical characters on data cards, as for example plastic credit cards.

Credit cards presently in use are typically made from calendered or extruded polyvinyl chloride plastic sheets. Cards are made by printing many areas on both sides of plastic sheets varying in thickness from .018 inch to .030 inch, and being approximately 24 by 32 inches in size. After printing, a thin film of a suitable plastic is placed on both sides of the printed sheets, which are then placed in a laminating press. Heat and pressure are applied and the film becomes bonded to the printed sheet. The latter is then fed through a suitable punch press which has been fitted with a blanking die operable to blank the cards out of the large sheet.

The blanks are then embossed with letters and numbers or such other information that is appropriate or required, the embossing process raising the faces or outlines of characters on a card so that they act as type when an imprinting roller is passed over the card causing the embossed character outline to be transferred to a document. In many cases the documents which are imprinted are read by an optical character scanner which punches this information into a tab card capable of being handled by computers.

The process of imprinting causes the imprinting roller to exert heavy pressure on the embossed characters, causing them to deflect. This is especially applicable in the case of ordinary embossed characters which are hollow. Repeated deflections eventually cause the characters to deform, i.e. they do not return to the height and/or shape which they had when they were originally formed. Because of this deformation, documents imprinted from such cards tend to lose their black intensity, which varies from character to character because of differences in character configuration. The continued loss of the character intensity forming capacity of a card eventually results in inability of a document scanner to recognize the imprinted characters.

In addition to changes in height of the characters induced by permanent deformaton, another problem occurs with hollow embossments. Even assuming that the characters are the same height when pressure is applied by the imprinter, the contact pressure distribution across the width or length of the character is very non-uniform. This occurs because the center section of the embossment is essentially a flat plate of plastic with the edges supported by vertical plates. The resulting non-uniform deflection causes larger graduations in the carbon impression than is the case for solid characters.

It is a major object of the present invention to overcome the above problems through the provision of method and apparatus to form solid embossed characters on sheets or cards and which will not deflect appreciably even after greatly extended use of the cards.

It is another major object of the invention to provide for rapid and automatic selection of the characters from multiple dies (i.e. numbers and letters) to be rapidly injection molded on a succession of cards.

It is a further object of the invention to provide method and apparatus for forming numeric and alphabetic character embossments on cards.

Briefly, the invention enables rapid forming of plastic characters adherent to the face of a plastic card, and in such manner that the embossments will not significantly deflect during repeated imprinting and card life will be greatly extended. As a result, the character images imprinted on documents will retain their dark intensity so that scanners will perform the reading process efficiently and accurately.

A series of relatively movable dies each having peripheral recesses to receive selective injection of hot plastic material that forms the embossments are supported for relative movement to selected positions. The apparatus further includes means to inject heated plastic material into the recesses via the die interiors in different selected positions of the dies and to bring selected peripehral die recesses into direct abutment with the surface of the sheet or card. The die recesses may have numeric or alphabetic shape, and clamp means are provided to effect relative clamping of the dies against the sheet so that selected embossment forming recesses are in direct abutment with the sheet surface. Also, heat sink means are provided to transfer heat through the sheet and away from the die recesses following softening of the sheet surface adjacent the recesses.

Typically, the dies have openings inwardly of the recesses and communicating therewith to pass the heated plastic material for injection into the recesses, and means is provided to deliver plastic to aligned openings in different die positions. In addition, means such as an endless conveyor is provided to carry the sheet or cards into direct exposure to selected die recesses at an embossing station. Sheet clamping at the embossing station is effected to unusually advantageous effect by a clamping part subjected to displacement into predetermined position to clamp a portion of the sheet or card into compressive surface engagement with the dies, that portion projecting free of the conveyor and being flexed so as to unflex when the clamp part is retracted.

One series of dies may have recesses configured to form a row of numeric solid embossments and the other series of dies may have recesses configured to form a row of alphabetical solid embossments, the conveyor located to transport cards to the second series of dies at a second embossing station. Further, the formed embossments may desirably be subjected to treatment effecting severing of embossment tops.

The apparatus further includes dies in the form of a stack of die wheels having peripheral recesses to receive selective injection of heated plastic material that forms the embossments, together with wheel driving, holding and clutch means for purposes to be described. The drive rotates the wheels in either of two directions and supports them for rotation; the holding means operates to selectively interrupt wheel rotation in one direction when selected recesses are exposed toward the sheet or card and to release the wheels for rotation in the opposite direction; and the clutch means are individually operable to decouple the wheels from the drive in response to interruption of wheel rotation in one direction, and to couple the wheels to the drive in response to drive rotation in the opposite direction. As a result, various combinations of solid embossments may be selected and provided on a plastic sheet or card, rapidly and efficiently.

In one unusually advantageous form of the apparatus, the dies comprise relatively rotatable wheels having a common axis of rotation and are arranged in stacked relation, the wheels having through openings inwardly of the recesses and extending generally parallel to the axis to receive plunger apparatus operable to effect injection of the heated plastic. The die wheels also have short drive channels communicating with the openings and recesses, whereby withdrawal of the plunger apparatus from the die openings interrupts the continuity of the heated plastic material adjacent the sprue channels. The plunger apparatus may typically include a tubular outer plunger having a side inlet to load heated plastic material into the interior of the outer plunger prior to reception of the plunger apparatus into the die openings, and a side outlet to transfer heated plastic material from the interior of the outer plunger into the sprue channels during reception of the plunger within the die openings. To this end, an inner plunger is movable lengthwise of, and within, the outer plunger to expel heated plastic through the side outlet.

In its method aspects the invention basically includes the steps of displacing heated plastic material under pressure into a die recess shaped to form an embossment character, and against a plastic sheet so that the heated plastic adheres to the sheet allowing the embossment to solidify, and removing the top of the embossment to form an imprinting surface. Where multiple dies at first and second stations are utilized, the dies at each station having multiple embossment forming recesses, the steps of the method typically include:

(a) relatively transporting the sheet into proximity to die recesses at the first station and displacing heated plastic material under pressure into the recesses and against the sheet surface to adhere as first embossments having short integral sprues;
(b) relatively transporting the sheet into proximity to die recesses at the second station and displacing heated plastic material under pressure into the recesses and against the sheet surface to adhere as second embossments having short integral sprues, and
(c) removing the tops of the embossments including the sprues to form imprinting surfaces in a common plane generally parallel to the sheet.

Additional broad aspects of the method include subjecting a series of sheets in the form of plastic cards to the above steps by simultaneously conveying different cards to the first and second stations; carrying out the removal step by milling the tops of the embossments at a third station; adjusting the relative positions of the multiple dies at each station to bring different combinations of character forming recesses into position for forming embossments on different cards; injectng heated plastic into the character recesses; and forming numerical embossments at one station and alphabetical embossments at another station.

The method of embossing of the invention utilizes a recessed die and includes the steps of:

(a) effecting relative clamping of a die against the sheet so that an embossment forming die recess is exposed adjacent a sheet surface;
(b) displacing heated plastic material under pressure from a source into the die recess to adhere to the sheet surface as an embossment subject to solidification;
(c) interrupting the continuity of the plastic material between the embossment and the source, and
(d) effecting relative separation of the die and the sheet surface with the embossment adherent to that surface.

This procedure assures emptying of plastic material from the die during each embossing cycle, particularly where the die has a short sprue channel to transfer plastic material into the recess and where the plastic continuity interruption is effected proximate the entrance to the sprue channel as for example by displacing source plastic material away from that entrance prior to die and sheet separation. The resultant embossments adherent to the sheet typically have projecting plastic sprues, and a further step includes removing the sprues and the tops of the embossments from the remainders of the embossments. One advantageous application of the method involves serial provision of the solid embossments on plastic credit cards at one station, and serially removing the sprues and embossment tops on the cards at another station.

Additional important steps in the embossing process include causing the raised lands or fences surrounding the recesses to penetrate the sheet to restrain escape of heated plastic material from the recess during injection; limiting die edge penetration of the sheet to allow outgassing from the recess at the die edge; and transferring sufficient heat to momentarily soften and then harden the sheet surface for bonding with the injected heated plastic material without incurring sheet warpage.

These and other objects and advantages of the invention, as well as the details of illustrative embodiments, will be more fully understood from the following detailed description of the drawings, in which.

Figures 2, 2A, 3:
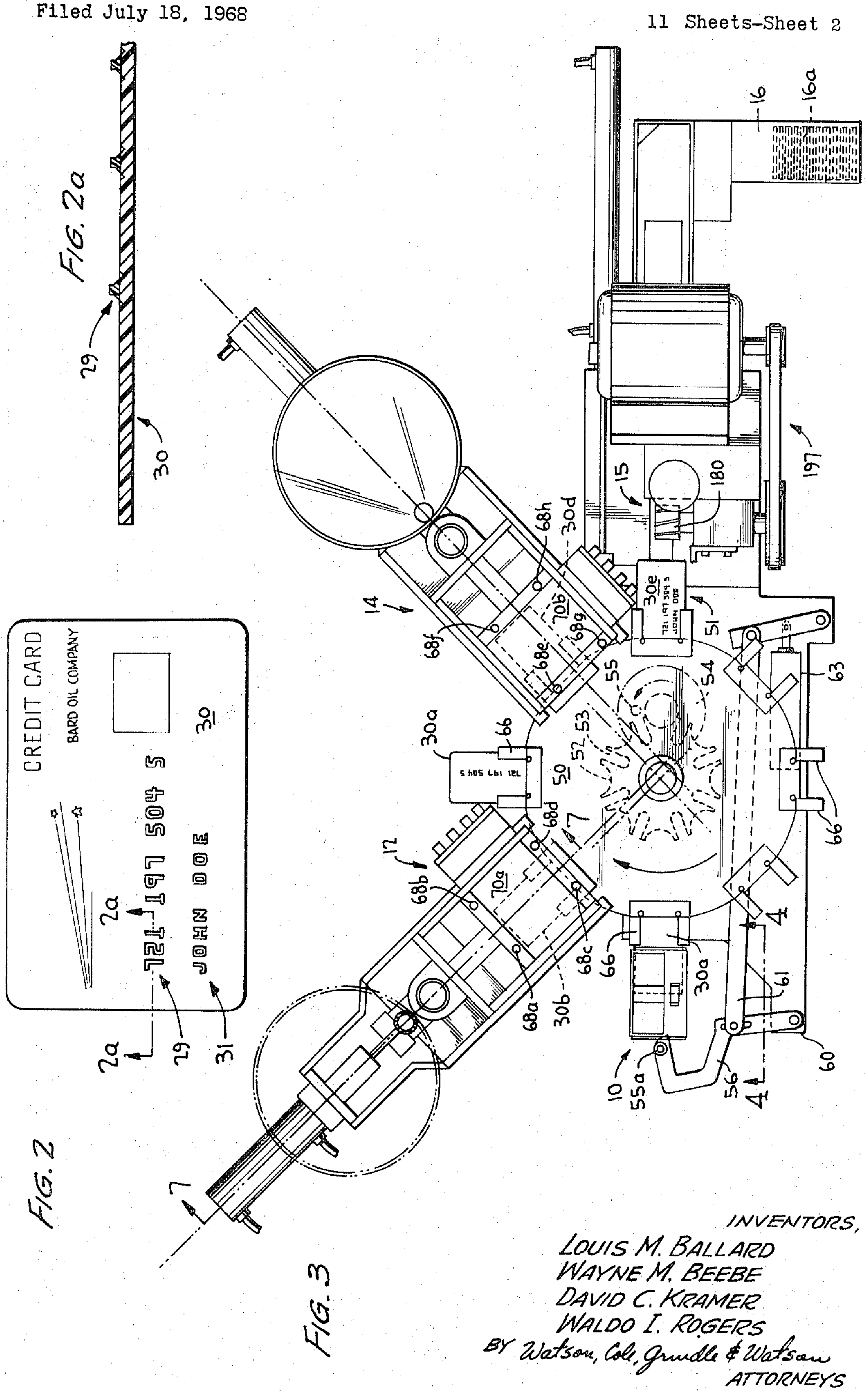
FIG. 2 is a view showing a credit card with alpha-numeric character embossments formed in accordance with the invention.
Figures 4, 6:
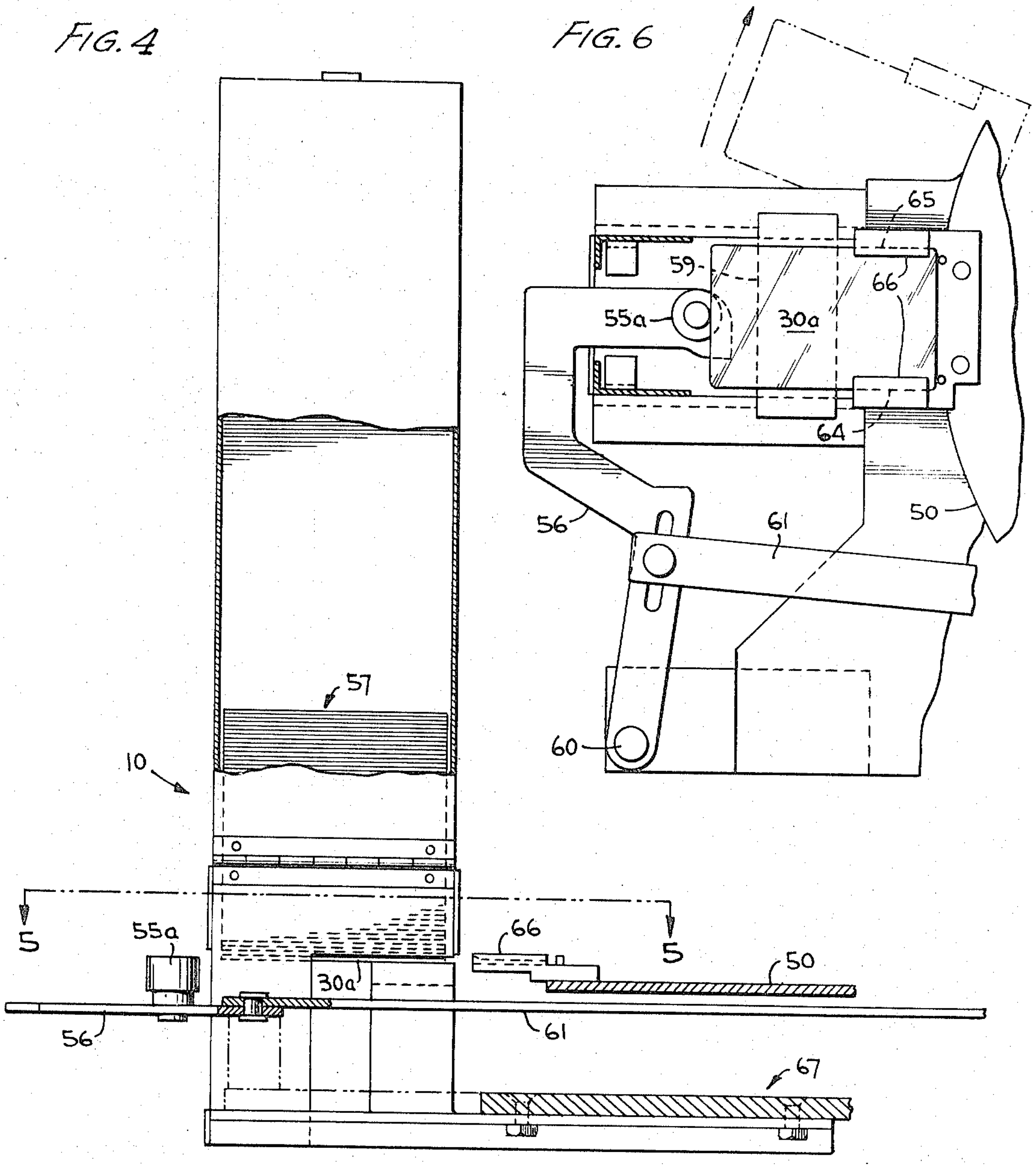
Figure 5:
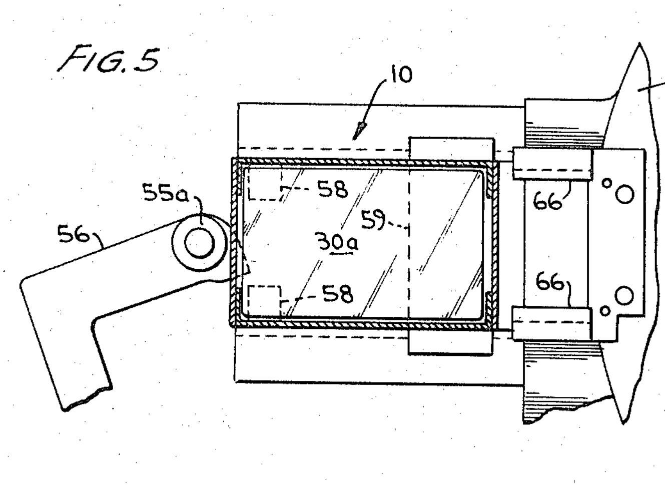
Figure 7:
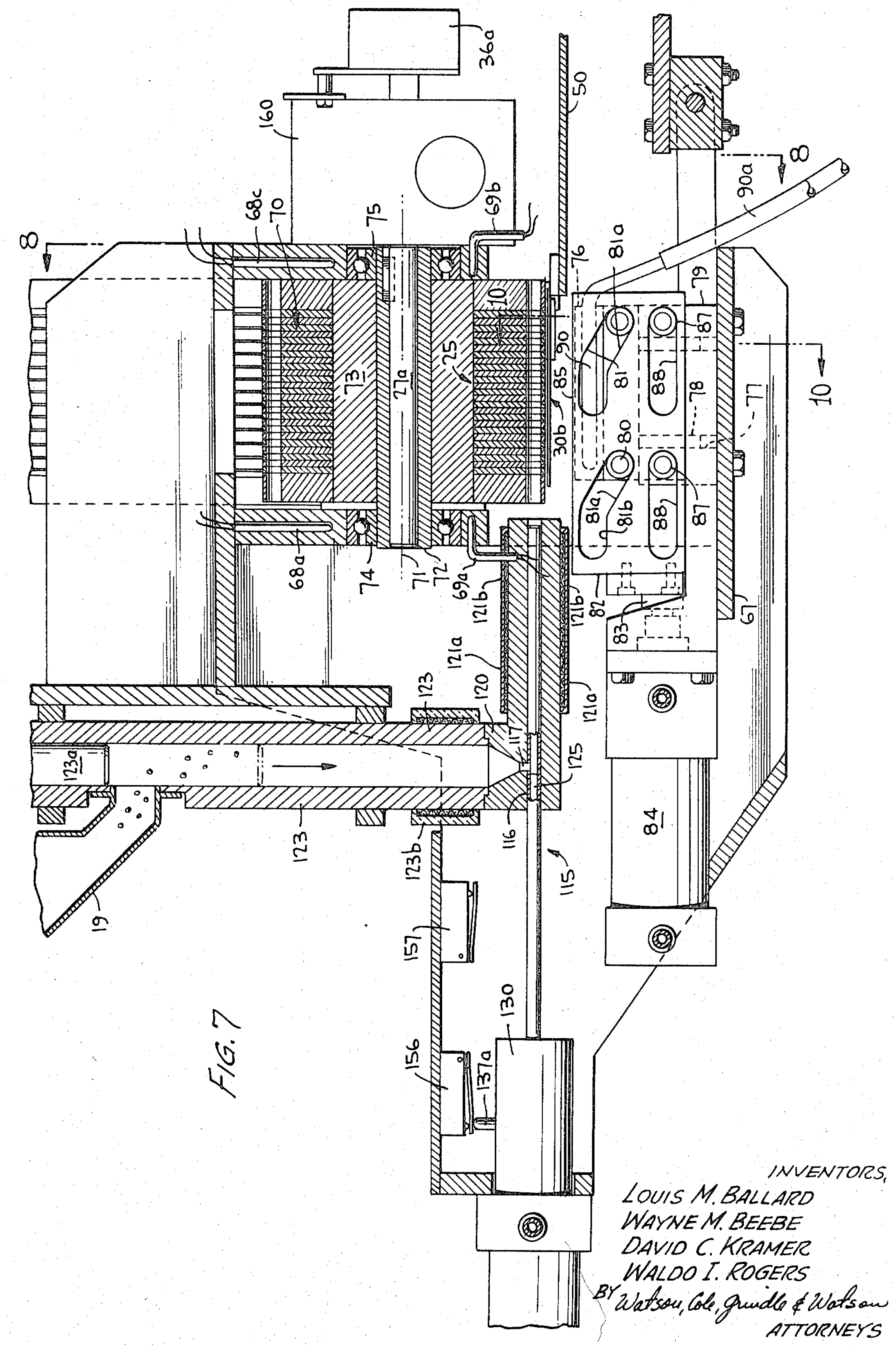
Figures 8, 9:
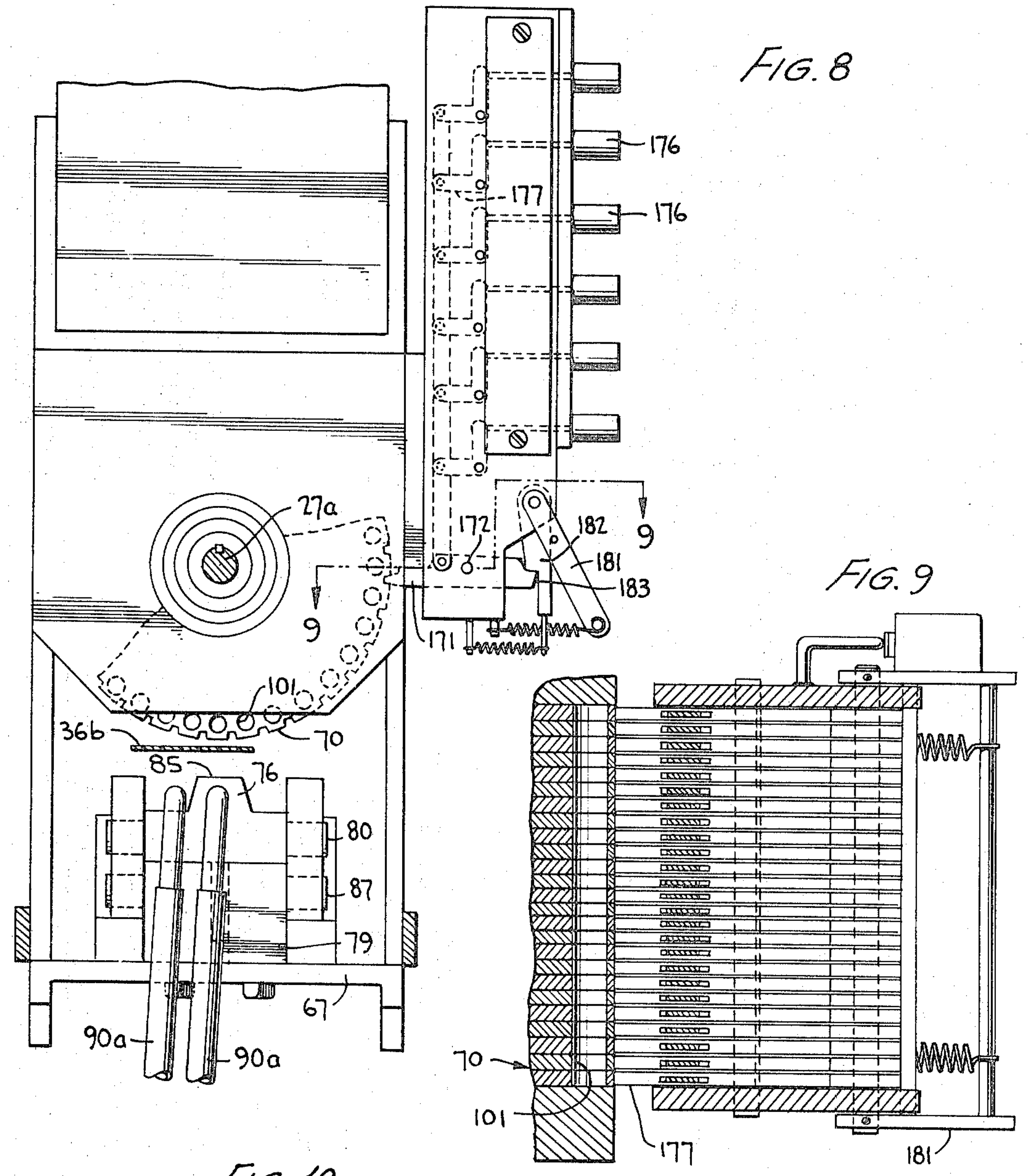
Figure 10:
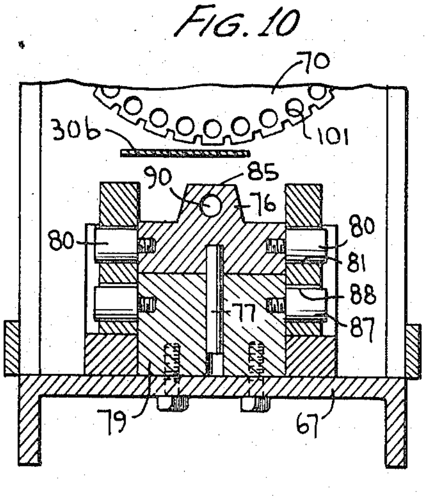
Figure 11:
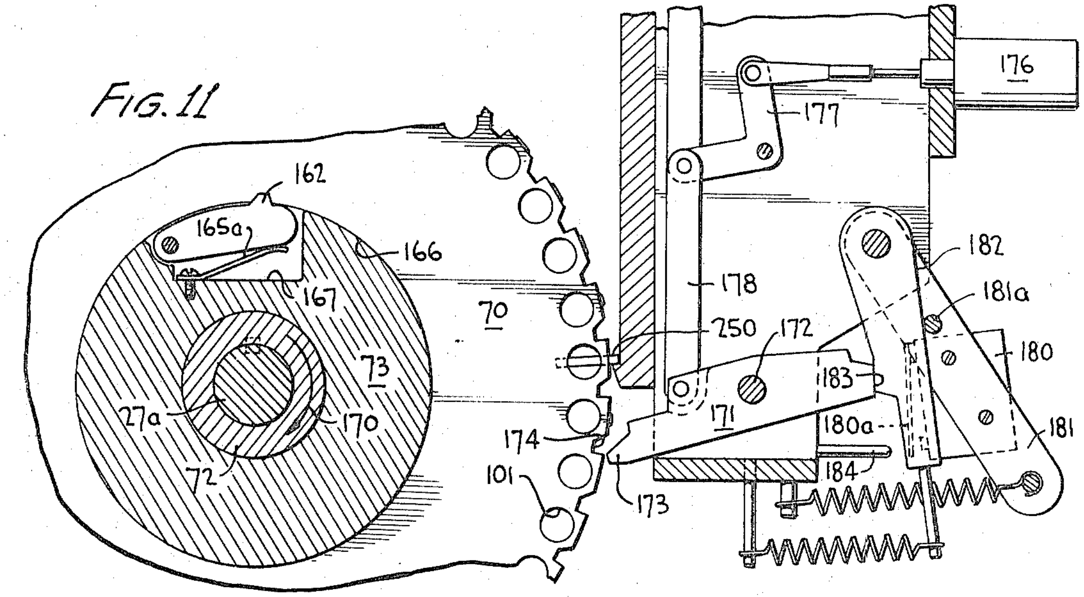
Figure 12:
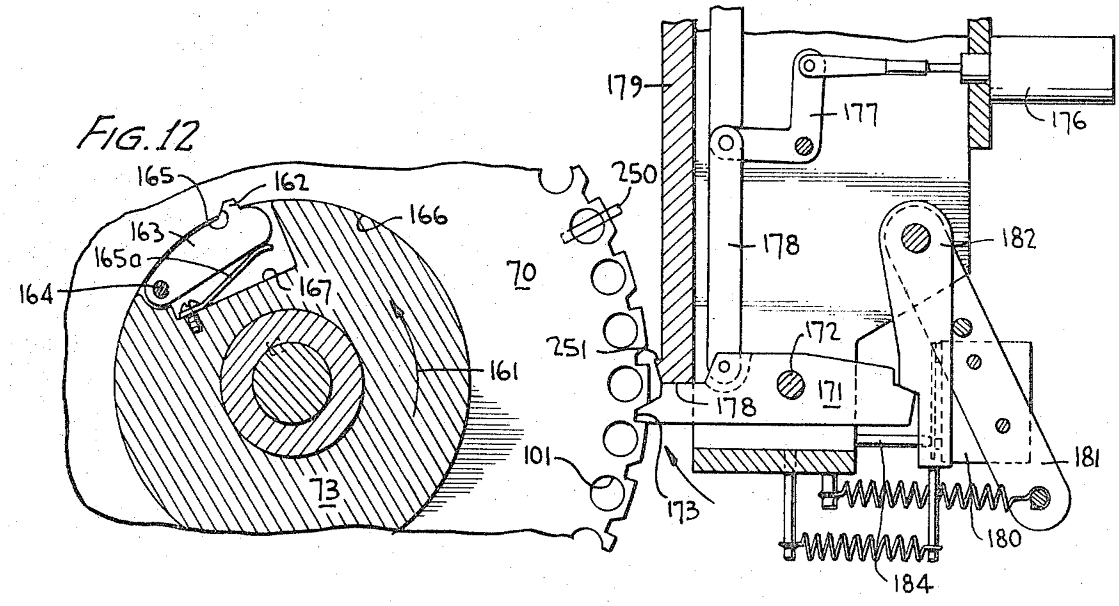
Figure 13:
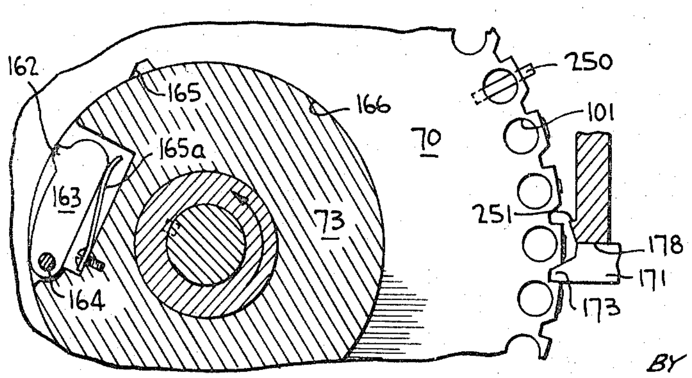
Figure 14:
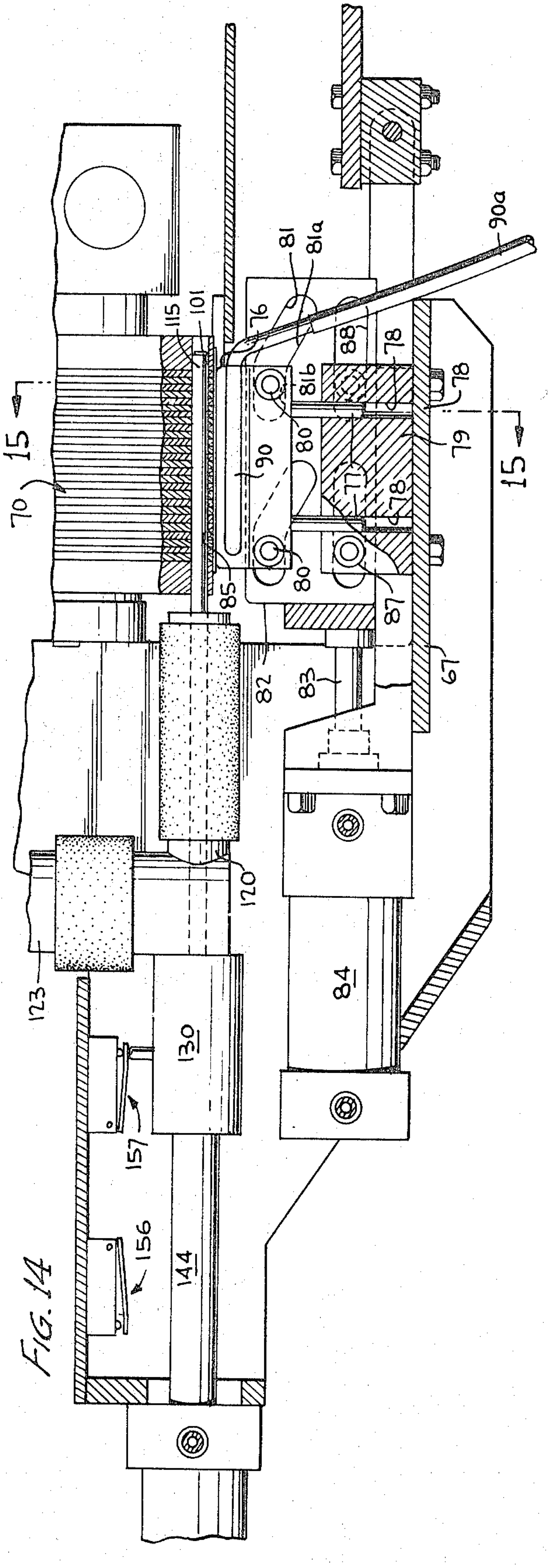
Figures 16, 16A:
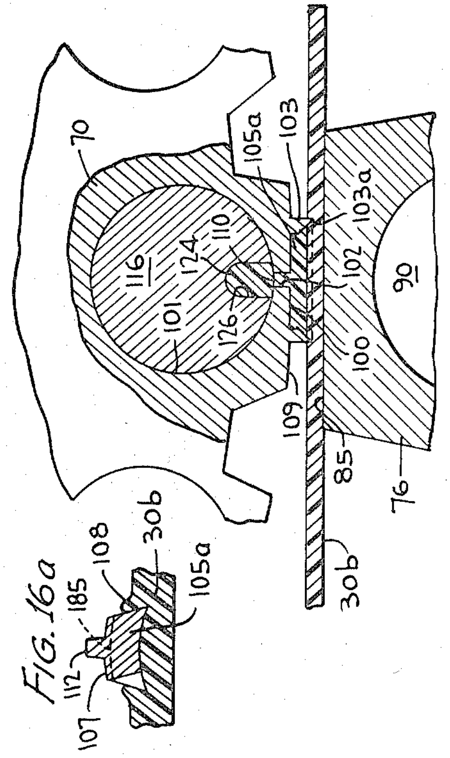
Figure 15:
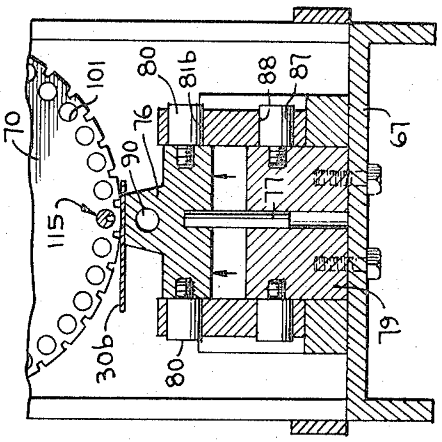
Figures 17, 18, 19, 20, 21:
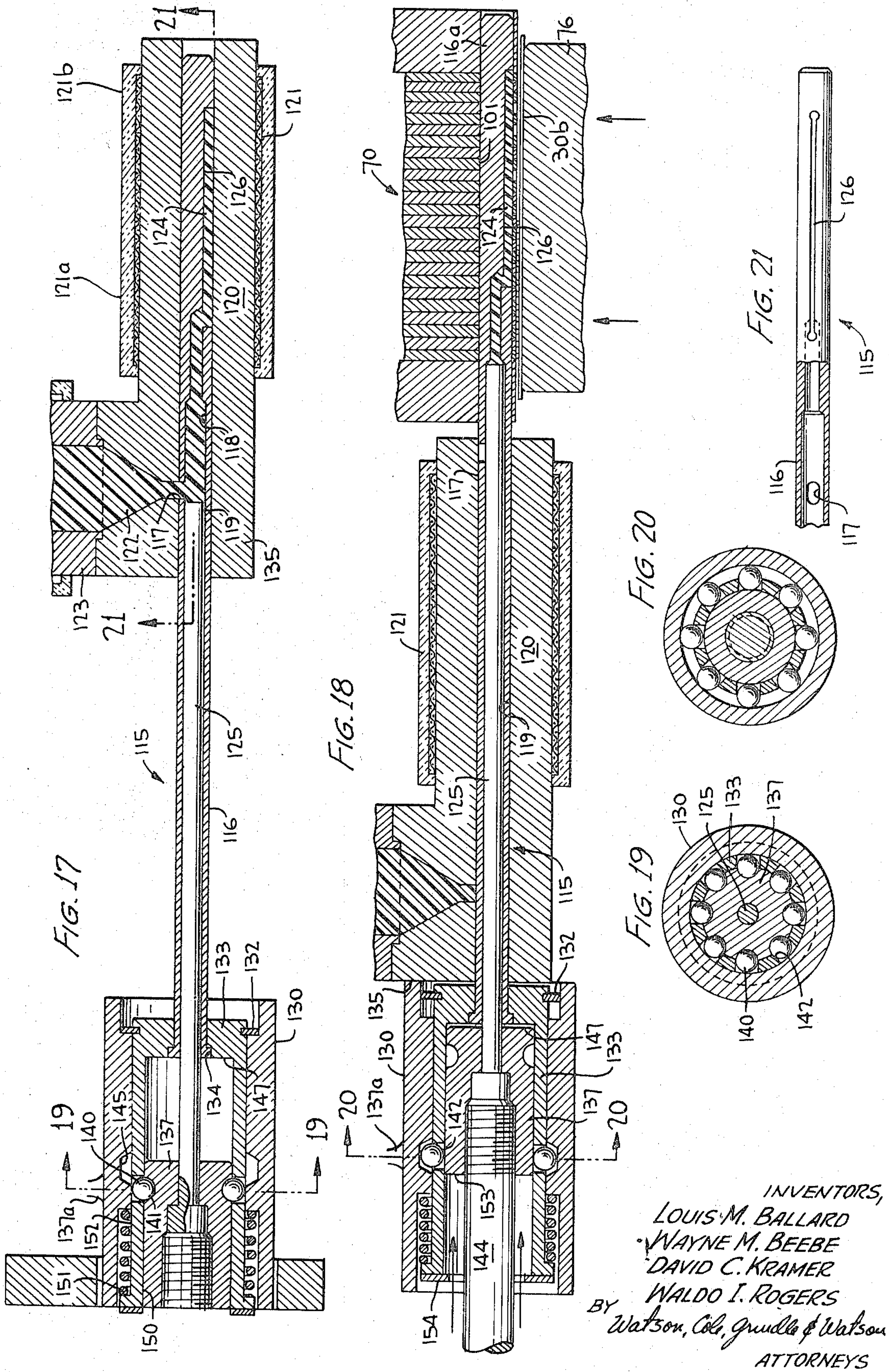
Figure 22:
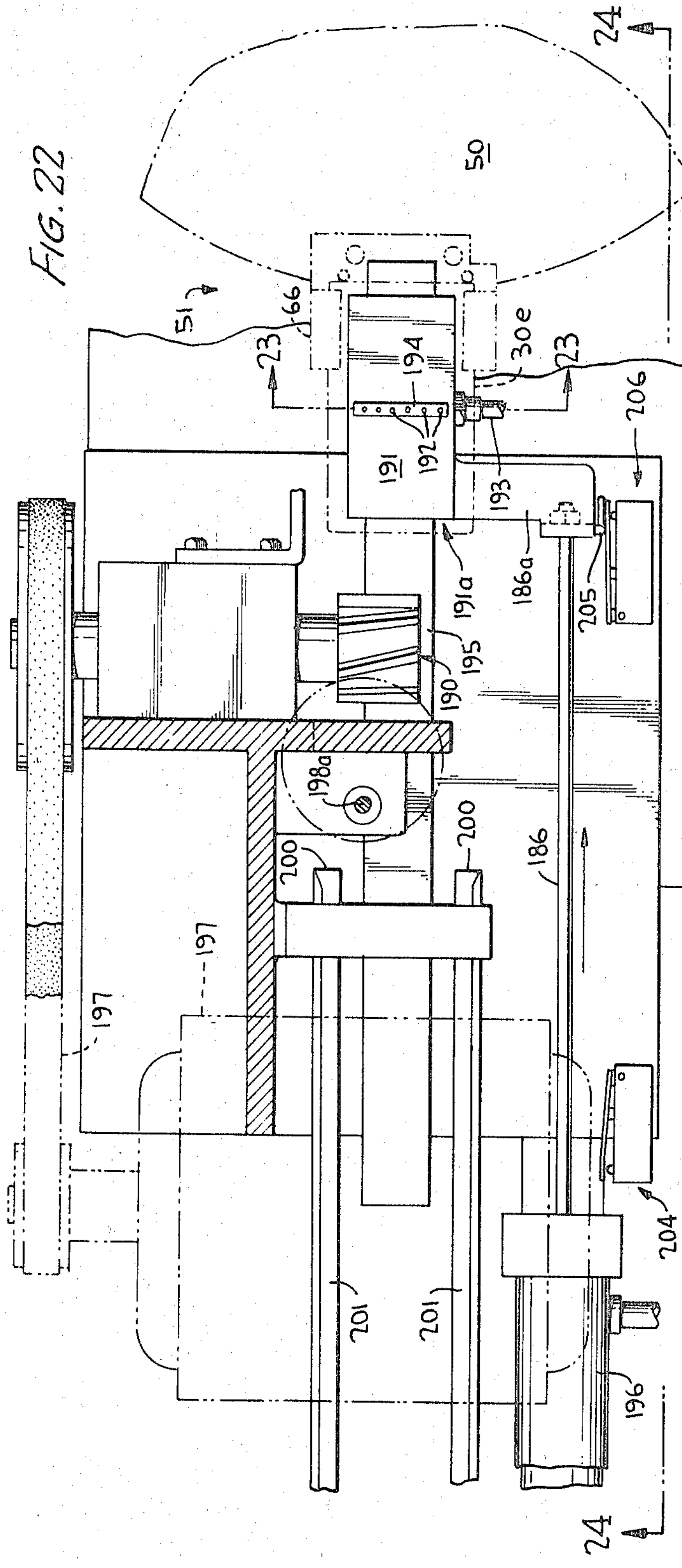
Figure 23:
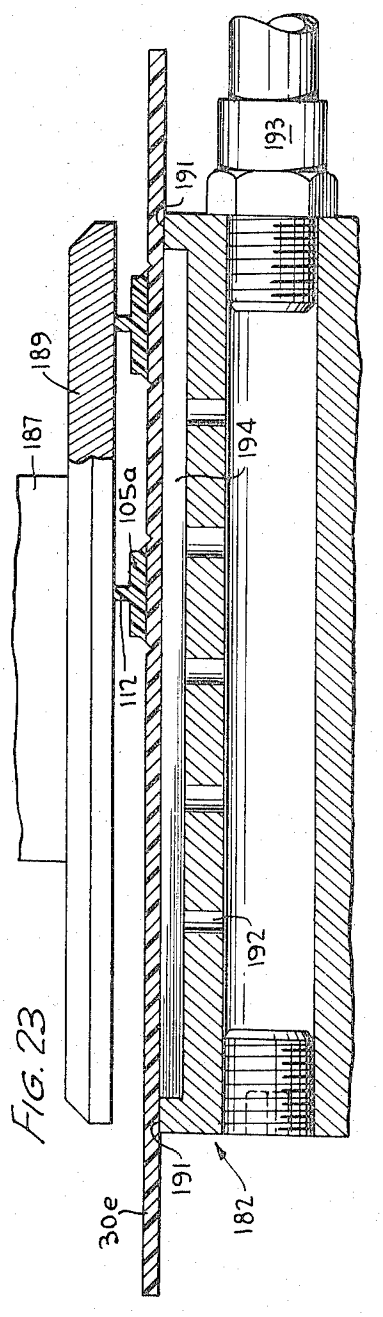
Figures 24, 25:
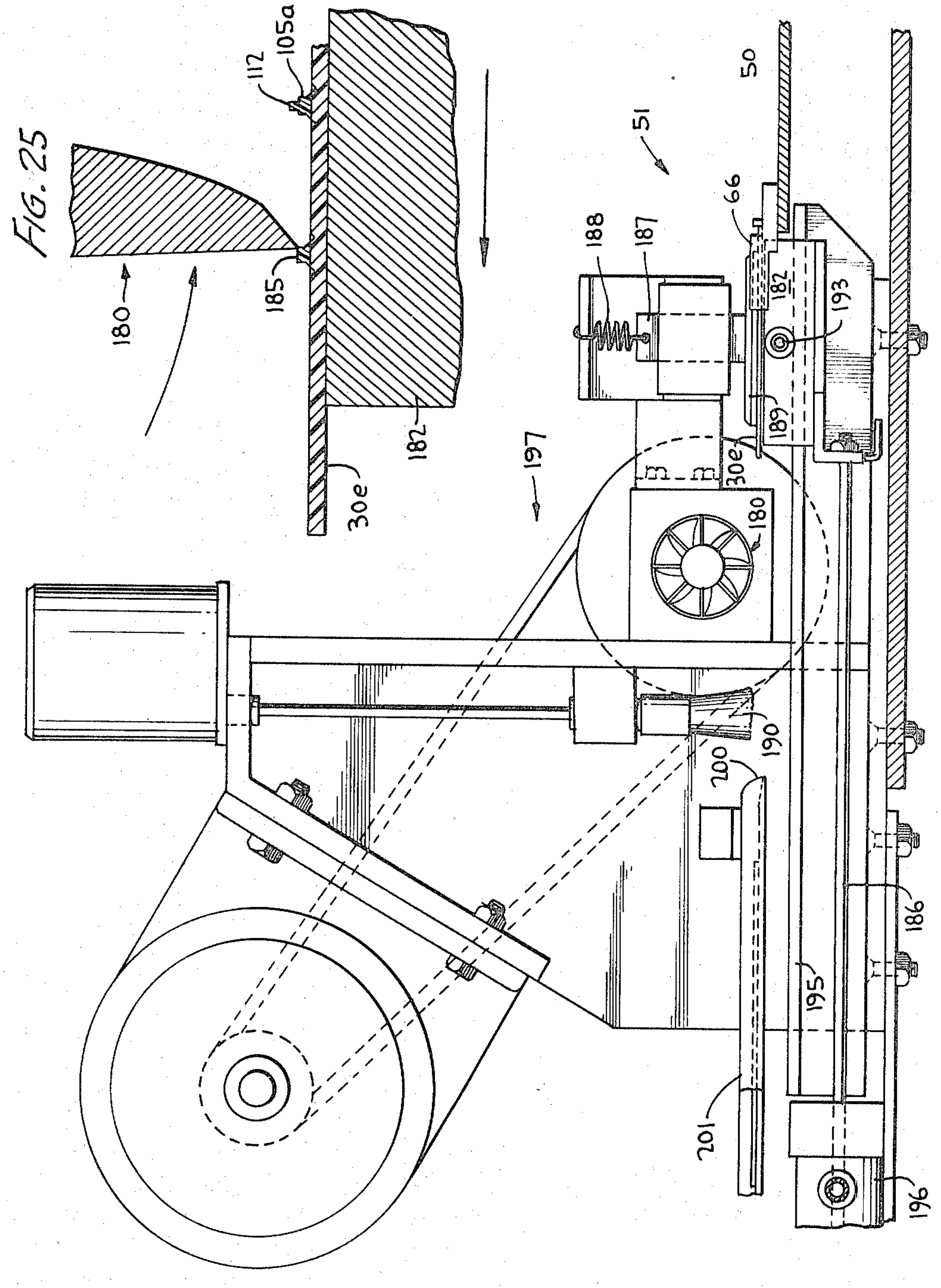
Figures 26, 27, 28:
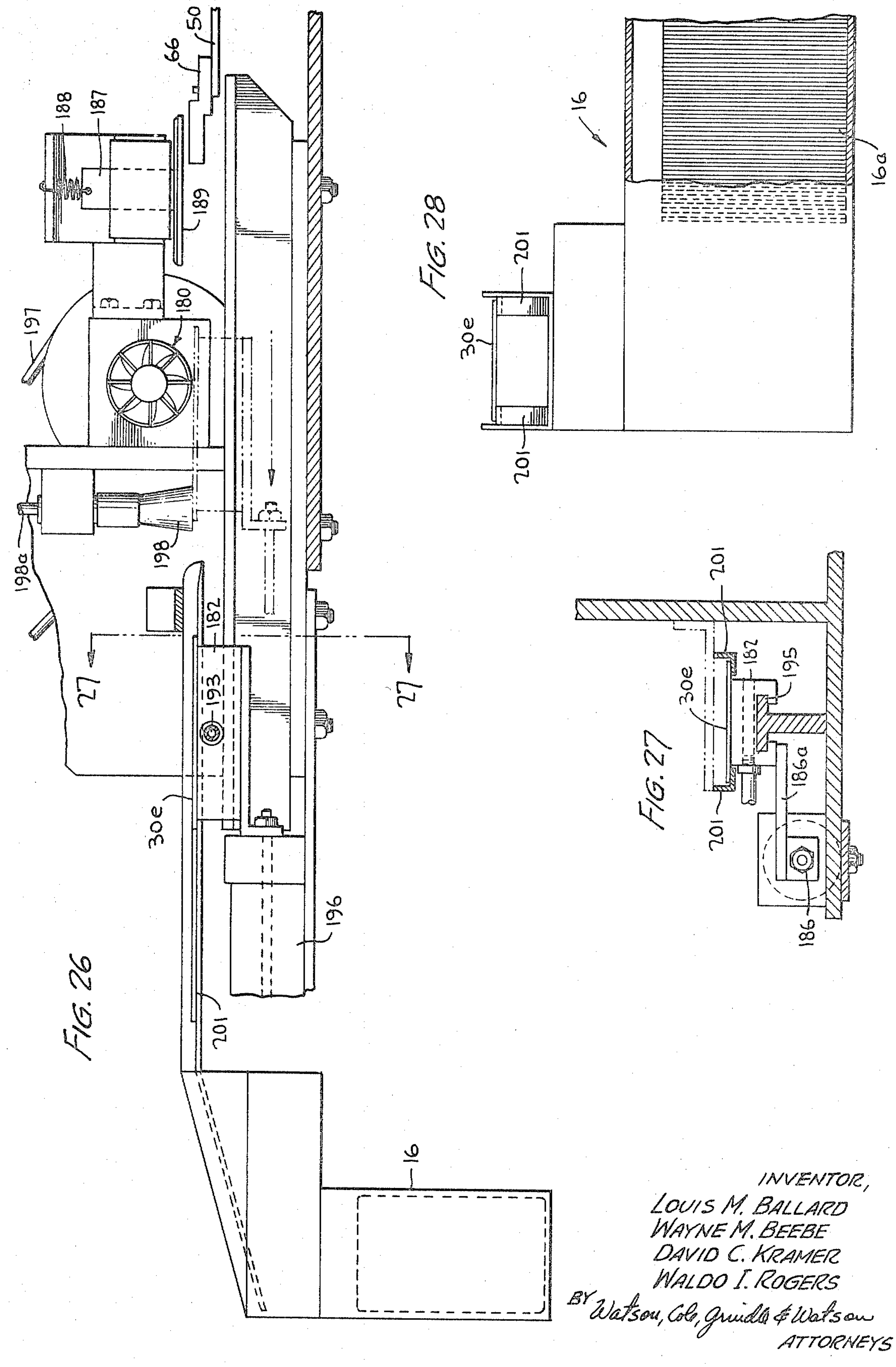

FIG. 2*a* is an enlarged section taken on line 2—2 of FIG. 2;

FIG. 3 is an over-all plan view of the embossment forming apparatus;

FIG. 4 is an enlarged elevation, partly in section, taken on line 4—4 of FIG. 3;

FIG. 5 is a horizontal section taken on line 5—5 of FIG. 4;

FIG. 6 is an enlarged plan view showing operation of the card feeding apparatus;

FIG. 7 is an enlarged vertical section of the embossment forming apparatus taken on line 7—7 of FIG. 3, and showing a card in position to be clamped prior to receiving injected heated plastic material;

FIG. 8 is a vertical section of the embossment forming apparatus taken on line 8—8 of FIG. 7;

FIG. 9 is an enlarged horizontal section of the embossment forming apparatus taken on line 9—9 of FIG. 8;

FIG. 10 is another vertical section of the embossment forming apparatus taken on line 10—10 of FIG. 7;

FIGS. 11–13 illustrate various stages in the operation of the character selection apparatus;

FIG. 14 is a view like FIG. 7, but showing a credit card clamped in posiiton to receive character embossments:

FIG. 15 is a vertical section taken on line 15—15 of FIG. 14;

FIG. 16 is an enlarged section showing in detail the manner of formation of a character embossment on a credit card or substrate;

FIG. 16*a* is an enlarged cross section taken through an embossment formed on a card or sheet;

FIGS. 17 and 18 are sections showing the manner of transferring heated plastic material to the character embossment forming apparatus;

FIGS. 19 and 20 are cross sections taken on lines 19—19 of FIG. 17 and 20—20 of FIG. 18, respectively;

FIG. 21 is a fragmentary view of the probe apparatus used in transferring heated plastic material in FIGS. 17 and 18;

FIG. 22 is an enlarged plan view of the embossment milling and card transfer station as also seen in FIG. 3;

FIG. 23 is an enlarged vertical section taken on line 23—23 of FIG. 22;

FIG. 24 is a side elevation showing the milling and transfer station of FIG. 22;

FIG. 25 is an enlarged section showing the manner in which a character embossment is subjected to cutting by a milling cutter;

FIG. 26 is a partial side elevation of the milling and transfer station showing card transfer;

FIG. 27 is a vertical section taken on line 27—27 of FIG. 26; and

FIG. 28 illustrates card reception in a receiver.

Figure 1:
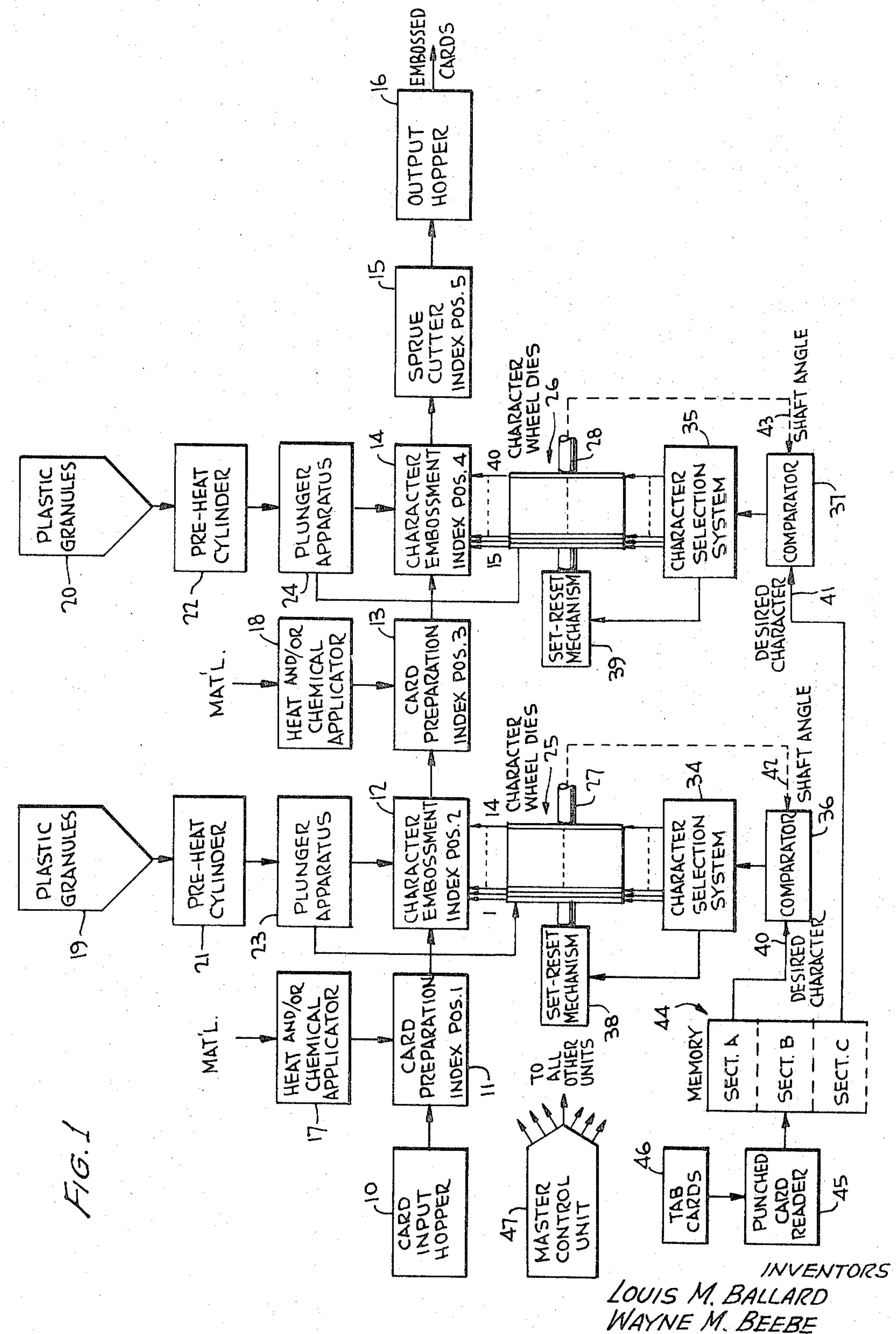
FIG. 1 is a block diagram showing the over-all system.

Referring first to FIG. 1, the sequence of card flow and treatment proceeds from card input hopper 10 through card preparation at 11 to embossing station 12. After a first character forming operation at 12 the card proceeds to further preparation at 13 before entering embossing station 14 to complete the embossment of alphabetical and/or numerical characters. The embossed cards then receive dressing at sprue cutter 15 and the finished cards are collected in output hopper 16. Card preparation at 11 and 13 may include the application of heat and/or chemicals as indicated at 17 and 18. Pre-treatment of the cards may be unnecessary in many instances and may be eliminated without affecting the embossing operations that follow.

Heated plastic material is supplied to embossing stations 12, 14 via plastic granule hoppers 19 and 20, respectively, through pre-heated cylinders 21 and 22 and plunger apparatus 23 and 24 to dies 25, 26; the latter each having recesses to receive selected injection of the heated plastic material that forms the embossments. As will be more fully explained hereinafter, the dies of each series are supported by structures 27 and 28 for relative movement to selected positions to bring individual die recesses into direct exposure to the sheet or card. The dies and sheet may be relatively clamped together to confine the selected die recesses for reception of heated plastic material.

The control of the relative movement of dies 25, 26 may be accomplished to unusual advantage by character selection systems 34 and 35 in response to inputs from comparators 36 and 37 and die set and re-set mechanisms 38 and 39, as will be described later in detail. Briefly, the comparators or encoders 36 and 37 receive desired character encode inputs at 40, 41, and shaft angle inputs at 42 and 43 from die wheels 25, 26, respectively, so that when the die rotating shaft has turned to an extent directly exposing a desired character recess on a particular die to the card, that die will be "picked" or held in that position by the character selection system. The various dies in series 25 are thereby "picked" in such a way as to present to the card the numerical character sequence corresponding to the sequence stored in section A of memory 44, and likewise the dies in series 26 are picked to present to the card the alphatical sequence stored in memory section C. Section B is a memory buffer receiving input from a reader 45, as for example and reader of punched tab cards 46, and information stored in section B is transferred to sections A and C at appropriate times so that solid embossments may be correctly formed on a sequence of cards kept flowing through the solid embossing apparatus. A suitable master control unit 47 controls the timing and operation of the system.

Reference to FIGS. 2 and 2*a* will show the row 29 of said embossed numerical characters as provided on card 30 by die series 25, and the row 31 of solid embossed alphabetical characters as provided by the die series 26. It is clear that one or the other of the character embossment stages 12 and 14 could be eliminated in the event the card or sheet were to embody only one row of solid embossed characters. Similarly, additional rows of alphabetical, numeric or alpha-numeric characters may be formed by the addition of more embossment forming stations.

Referring now to the detailed apparatus, FIG. 3 shows cards **30*a*–30*e* having various positions on an indexing endless conveyor such as turntable 50. Card 30*a* is being loaded into the turntable from the input hopper 10; card 30*b* is being subjected to numerical embossment at station 12; card 30*c* is turning from station 12 toward station 14 where card 30*d* is being subjected to alphabetical embossment; and card 30*e* is at a removal station 51 in position to be advanced for sprue grinding at station 15 and subsequent collection in hopper 16. Indexing of the turntable is controlled by any suitable means such as a Geneva mechanism that includes sprocket 52 integral with the table and having radial slots 53, a rotor 54, and a pin 55 on the rotor. The sprocket and table are turned through the correct indexing angle while the pin 55 is meshed with the sprocket as the rotor turns. The table remains in a position as illustrated while the pin rotates free of the sprocket, to allow time for the character embossment operations as well as card loading onto and card retrieval from the table. The temperature of the plastic within stations 12, 14 is maintained within ±2° F. by means of heater elements 68*a*–68*h*, thermocouples 69*a*, 69*b*** (FIGS. 3 and 7), and automatic proportional control apparatus (not shown). The die station heating will be more fully described hereinafter.

With continuing reference to FIG. 3, and additional reference to FIGS. 4, 5 and 6, pusher rod **55*a* on pivoted arm 56 is operable to engage the lowermost card of stack 57. The stack is retained against dropping in the hopper by underlying ears 58 and support plate 59 attached to the hopper. Arm 56 is swung on pivot 60** operated by actuator 63 via arm 61 and link 62 by an actuator 63, as best shown in FIG. 3. FIG. 6 shows pusher rod 55*a* advancing the lowermost card 30*a* into position on the turntable, where its edges 64 and 65 are retained by lightly biased spring clips 66 carried by table 50. The hopper and turntable are supported by base structure 67.

At the station 12 as illustrated in FIGS. 7 and 8, card 30*b* is presented directly beneath a stack or series 25*a* of die wheels 70 having a common axis 71 of rotation. Wheels 70 are supported by shaft 27*a*, sleeve 72 keyed on the shaft, and hub 73 rotating with the sleeve, the latter being bearing supported at 74 and 75.

As shown in FIG. 3, heater elements 68*a*–68*h* are mounted in die wheels 70*a*, 70*b* in stations 12, 14, respectively, to provide heat to the plastic in the die wheels so that the plastic may be maintained within a desired temperature range. As shown in FIG. 7, thermocouples 69*a*, 69*b* are provided to sense the temperature at the back and front, respectively, of die wheel 70*a*. Thermocouples are similarly mounted in die wheel 70*b*. The two front heater elements 68*c*, 68*d* are connected to an automatic proportional control (not shown) which receives the temperature sensed by thermocouple 69*b*. In a similar manner, thermocouple 69*a* is connected to another automatic proportional control (also not shown) along with heater elements 68*a*, 68*b*. Heater elements 68*a*–68*h* may be cartridge-type heaters known to the art. The automatic proportional controllers may be of any proportional types known to the art whereby signals representative of a sensed temperature are used to control a remotely located heater element.

The front end of the die wheel stack is controlled at 280° F. and the back end of the die wheel stack is controlled at a temperature of 255° F. The automatic proportional controllers closely maintain each of these temperatures to within plus or minus 2° F. During the injection process the local temperature in the region of the die cavities reaches a peak temperature of 360°–390° F. The temperature values indicated above are significant to the injection process since if the wheel temperature is too high, plastic leaks between the die stacks and cements them together so that they cannot move individually. If the temperature is too low, the plastic cools too rapidly and it will not feed to the small sprue holes and fill the cavities. The temperature in the die wheel is also important so that heat will not be drawn from the plunger apparatus too rapidly when the plastic material is injected into the die recesses and onto the sheet material surface. If the die wheel temperature is too high, the plastic on the sheet material surface adjacent the indentations made by the raised fences around the characters will become too soft and an effective seal will not be formed thereby allowing plastic to leak beyond the raised fences defining the character. Additional control for maintaining the plastic at the proper temperature is provided with the plunger apparatus and will be described hereinafter.

Extending directly beneath the card 30*b* is a clamp block 76 which is guided for vertical movement by leader pins 77. The pins are integral with the clamp block and guide in vertical bores 78 in guide block 79 attached to base support 67. Also, the clamp block has cam followers 80 projecting laterally in cam slots 81 formed by actuator plate members 82 extending at opposite sides of the clamp block. Actuator plate members 82 are movable generally horizontally and radially inwardly (rightwardly in FIG. 7) with respect to turntable 50 in response to movement of the piston in power cylinder 84 and actuator rod 83. This effects elevation of the clamp block bringing block surface 85 into even and uniform compression with the underside of the card 30*b*. Note that the clamped portion of the sheet projects free of the turntable, and must be flexed upwardly to engage the dies.

To produce an upward flexing of the sheet, slots 81 and cam surfaces 81*a* are angled generally radially and upwardly as shown in FIG. 7, terminating at angled plateaus 81*b* such that engagement by the followers 80 will hold the block in predetermined compressive engagement with card 30*b*. Final vertical movement of block 76 may be provided by a bolt which projects through guide block 79 and engages an extending member of plates 82 to restrict forward movement of actuator rod 83. Such means have not been illustrated for the sake of clarity. Plate members 82 confine and laterally orient clamp block 76, and they are themselves constrained against vertical movement during their radial displacement by means of tongues 87 projecting laterally from guide block 79 and into horizontal and radial guide grooves 88 formed in members 82.

It should be noted that the clamp should not be allowed to approach too close to the dies, since the raised lands around the characters would then penetrate the card too deeply and the card material inside the raised lands would fill the recesses. On the other hand, if the clamp is not allowed to approach the die wheels closely enough, the penetration of the raised lands is too shallow and consequently the lands will not produce an effective seal on the card surface. In this condition the injected plastic would leak around the bottom of the lands and out onto the card surface. When the card is properly clamped there is always a slight amount of leakage. However, it is necessary to control the leakage to a narrow region around the characters (approximately 0.010 inch wide). Such controlled leakage helps to anchor the characters and outline the edges of the characters to give them a bold appearance. Controlled leakage is also necessary to allow proper outgassing.

The surface 85 of clamping block 76 is cooled by a refrigerant in conduit 90 projecting internally of the block and proximate surface 85 for heat transfer therewith. Accordingly, sufficient heat is rapidly transferred by conduction from the sheet or card 30*b* during momentary clamping thereof as to promote the bonding of embossed characters to the card upper surface. For example, the card upper surface receives sufficient heat from the plastic to momentarily soften the plastic surface. The lower surface of the card is cooled simultaneously to prevent penetration of the heat to the lower surface of the card and to prevent the development of ripples on the lower surface produced by unrestrained, non-uniform thermal expansions and contractions. Note line 90*a* by which refrigerant is transmitted to unit 90, and which is movable with the clamp block.

Representative plunger apparatus 115 includes a portion which is inserted into temperature control body 120. The front half of tubular outer plunger 116 is loaded with heated plastic. Associated with body 120 are suitable heaters 121*a*, 121*b* to heat, via body 120, the plastic slug therein to maintain the plastic at sufficiently elevated temperature prior to insertion of the plastic material into the die wheels. For the above purposes, plunger 123*a* is movable in container 123 to feed plastic under pressure through inlet 117. Additional heaters are illustrated at 123*b*. Limit switches to control plunger cycling are indicated at 156 and 157 as being engageable by abutment 157*a* on outer carrier 130.

Body 120 is preferably heated with the two cylindrical electrical heating elements indicated as 121*a*, 121*b* and additional heating of the plastic within container 123 is provided by heating elements indicated as 123*b*. Heater 121*b* is preferably located at the front of body 120 and positioned with respect to die stack 25 as shown in FIG. 7. A thermocouple (not shown) is inserted into a small hole drilled into the side of body 120 adjacent to the heater 121*b*. This thermocouple may be attached to a temperature controller which turns the heater on and off to control the temperature at 510° F. Cylindrical heater 121*a* is mounted at the back end of body 120 and heater elements 123*b* are attached at the lower portion of container 123. A thermocouple (not shown) may be mounted adjacent to rear cylindrical heater 123*a* and connected to a second temperature controller. Rear cylindrical heater 123*a* and the heater elements 123*b* may be preferably wired in parallel and controlled simultaneously from the latter mentioned thermocouple.

Referring now to FIGS. 9–13, the apparatus and procedure to control slection of die wheel recess combinations presented to a card 30*b* will now be described. As previously mentioned, a drive is provided to rotate the wheels in either of two directions, and may for example include shaft 27*a*, capable of being driven in opposite directions by the motor 160, a sleeve 72 on the shaft and the hub 73 as shown in FIG. 7.

First of all, assume wheel rotation counterclockwise in the set direction, as indicated by arrow 161 in FIG. 12. Individual clutch means are provided to releasably couple the wheels 70 to the drive, for example hub 73, for rotation in the set direction. Such clutch means may typically include latch dogs 162 on links 163 pivoted at 164 to swing the latch dogs toward and away from notches 165 in the wheel inner peripheries. Flat springs 165*a* continuously urge the links in directions tending to engage the dogs 162 against wheel inner peripheries 166. These link, dog and spring elements are carried in cut-outs 167 in the hubs.

Holding means are also provided to selectively interrupt wheel rotation in one direction, for example the direction of arrow 161, when selected plastic receiving recesses 100 in the wheels are turned into direct exposure toward the sheet or card 30*b*. The holding means are also operable to release the die wheels for rotation in the opposite direction as indicated by arrow 170 in FIG. 11. In the illustrated example, the holding means takes the form of a member or lever 171 pivoted at 172 to rotate into and out of engagement with a die wheel. As seen in FIG. 12 the arm includes a dog 173 engaging a notch 174 in the die wheel periphery, interrupting rotation of that wheel in the set direction 161.

Control means to operate the holding means includes an encoder 36*a* responsive to drive rotation in one direction and to selected coded input, as previously described at 42 and 40 in FIG. 1. For example, when a number "7" is to be formed, the encoder 36*a* compares the "7" input with rotation of the shaft 27*a* to bring the "7" recess at the wheel periphery opposite the card 30*b*. Upon such occurrence, the encoder activates an actuator 176 which, as seen in FIG. 12, pivots the arm 171 into the position illustrated via linkage elements 177 and 178, thereby "picking" the desired recess for reception of heated plastic material to form the solid embossed numeral "7" on the card. Wheels 70 are independently operated or "picked" in this manner to produce the desired combination of solid embossed characters. Further, the arm 171 thus pivoted is blocked against rotation in the direction of arrow 161 by the shoulder 179*a* of fixed structure 179, but remains free to pivot in the opposite direction.

When a die wheel is thus picked, a limit switch 180 carried on link 181 is then actuated, inasmuch as a cam lever 182 is released by a shoulder 183 on arm 171, lever 182 engaging link 181 by means of pin 181*a* and turning therewith to bring the switch arm 180*a* into engagement with abutment 184. Springs 185 and 186 bias lever 182 and link 181 clockwise as shown. Operation of the limit switch deactivates the solenoid actuator 176 and clears the section of memory 44 that stored the numeral thus "picked". When all of the wheels are picked, all of the cam levers are in the position shown in FIG. 12, and the pin 181*a* links 181 and the limit switch 180 are allowed to move inward. This provides a fail-safe mechanism to insure that all the wheels have been selected before the plunger can be inserted into the wheels.

When the wheel 70 is blocked against further rotation in the set direction as described, the clutch means, as for example dog 162, decouples the wheel from the drive allowing continued rotation of the drive in the set direction 161 to carry other wheels 70 into angular positions to be "picked" by their controls. Such decoupling is for example afforded by the cam angularly of the notch 165, and continued rotation of the drive after decoupling is illustrated in FIG. 13, the dog 162 having been retracted out of the notch.

Following an embossing operation, the drive is rotated reversely in the reset direction indicated in FIG. 11. Such rotation eventually results in the dogs 162 latching into the notches 165 to rotate the wheels 70 in reset directions. Such wheel rotation is afforded inasmuch as the holding means release the wheels, the arms 171 being freely movable away from abutments 178. After all latch dogs 162 drop into the wheel notches, i.e. following a complete cycle of rotation of the drive in the reset direction, the apparatus is ready for another cycle of operation. Engagement of stops 250 on the wheels with fixed shoulders 251 locates the wheels in positions for the next picking cycle. Finally, it should be observed that when the wheels are all "picked," the openings 101 which receive the plunger apparatus are in alignment.

The dies of each series 25 and 26 may typically have the highly advantageous construction and mode of operation as will now be described in connection with FIGS. 14–16. Die wheels 70 have peripheral recesses 100 to receive selective injection of heated plastic material that forms the character embossments. Also, the die wheels have circularly spaced through openings 101 respectively located inwardly of the recesses and communicating via short sprue channels 102 with recesses 100 to pass heated plastic material for injection into the recesses. Each recess is bounded by an edge or projection 103 terminating at a bounding land 103*a* which tapers as seen in FIG. 16 to penetrate the card or sheet 30*b* to an extent predetermined by the degree of movement of the clamping block 76 toward the die wheels. The penetration is such as to confine the heated plastic material as it is injected under pressure into the recess and against the surface of the card 30*b*, the card being heated as explained above to promote bonding at the interface between the card and injected plastic.

FIG. 16*a* shows a typical character embossment 105 formed on a card 30*b* and bonded in position at interface 107. In addition, the embossment 105 is held in position by the peripheral plastic bulge 108 formed during the embossment forming process, as a result of penetration of the card by tapered land terminal 103*a* and also as a result of outgassing and injected plastic flow across the land terminal penetrating the card. As shown in FIG. 16, the die wheel is relieved at locations 109 against the outer side of land 103 to accommodate formation of plastic bulge 108 and outgassing.

In addition to the clamping and injection steps described, the solid character embossment forming method advantageously includes the step of interrupting the continuity of the plastic material between the formed embossment and the source of heated plastic material, and preferably prior to relative separation of the die wheel and card. Typically, the continuity is interrupted at the entrance 110 to the short sprue channel 102, any tendency of the die wheel to adhere to the embossment is minimized, and the only excess plastic material left adherent to the embossment is the short plastic sprue as better seen at 112 in FIG. 23. Also, the die wheel is emptied of plastic material in order to place it in condition most favorable to repeated rapid solid embossing cycles.

For the above purposes, means is provided to inject heated plastic material under pressure into the die recesses 100 via the die interiors in different selected positions of the dies and to interrupt the continuity of the heated plastic material within the dies. Such means typically includes plunger apparatus insertable into the die interiors in selected die positions to effect heated plastic injection. As best seen in the example illustrated in FIGS. 17–21, representative plunger apparatus 115 includes tubular outer plunger 116 having side inlet 117 to load heated plastic material into interior 118 of plunger 116 during reception of the forward portion of that plunger within bore 119 of temperature control body 120. Associated with body 120 are suitable electric heaters 121*a*, 121*b* from which heat is transferred via body 120 to the heated plastic slug 124 loaded into the plunger, so as to maintain such plastic at sufficiently elevated temperature prior to plunger insertion into the die wheels. Plastic material is typically supplied at 122 to inlet 117 from a heated container 123, in retracted position of the plunger apparatus.

The plunger apparatus 115 also includes an inner plunger 125 movable lengthwise of, and within, the outer plunger to expel heated plastic slug 124 through outlet slot 126 formed in the side of the outer plunger, and during reception of the plunger apparatus within a row of selected die openings 101, as seen in FIG. 18. Slot 126 communicates directly with the row of short sprue channels 102, as is clear from FIGS. 16 and 18. Following such withdrawal, the continuity of plastic material in the latter is withdrawn to the position seen in FIG. 17. During such withdrawal, the continuity of palstic material in the dies is severed at the entrances to the sprue channels due to the fact that the forward portion 116*a* of the outer plunger circumferentially closely fits and is retracted through die openings 101.

Actuator mechanism to operate the plunger mechanism includes rod 144 movable to the right to transport the body 137 and the inner plunger 125 connected thereto to the right. The outer plunger 116 is also transported to the right by the inner carrier 133 to which it is connected, body 137 being coupled to the inner carrier by balls 140. The balls are received within peripheral recess of body 137 and within slots 142 in inner carrier 133. Finally, the outer carrier 130 is transported to the right by spring 150 located between shoulders 151 and 152, respectively, on the inner and outer carriers. Ring 132 on inner carrier 133 engages the outer carrier to limit expansion of the spring.

Following arrest of rightward movement of the outer carrier by its engagement with shoulder 135 as seen in FIG. 18, the body 137 and inner carrier continue to the right. When balls 140 arrive inwardly opposite the inner groove 145 in the outer carrier, the balls enter that groove and decouple from the body 137, whereby the inner carrier 133 couples to the arrested outer carrier and stops its rightward movement as well as rightward movement of the outer plunger 116. The body 137 continues moving to the right with inner plunger 125 until body 137 approaches inner shoulder 147 of the inner carrier. Note that body 137 is slidable within the bore of inner carrier 133, and the latter is slidable within the bore of the outer carrier.

When rod 144 is retracted, the inner plunger and body 137 are first retracted relative to the carriers and the outer plunger. When the left face 153 of the body 137 engages the stop ring 154 on the inner carrier, the latter is urged to the left, and balls 140 are cammed into the groove 141 on body 137 which is now opposite the balls. Both plungers are now retracted and finally the outer carrier is retracted when ring 132 engages the right face of the outer carrier. Slots 142 in the wall of the inner carrier retain the balls 140. Limit switches to control plunger cycling are indicated at 156 and 157 in FIG. 7, and as being engageable by abutment 157*a* on the outer carrier 130.

In a typical example, both the card 30*b* and the injected plastic material consist of ABS, i.e. acrylonitrile-butadiene-styrene containing appropriate stabilizers and lubricants and specifically excluding stearic acid, and more particularly the card consists of type GSE and the injected plastic consists of type DH, both being products of Marbon Chemical Company of Washington, W. Va. These materials are characterized by their toughness, to stand repeated imprinting; high softening temperature and ability to bond together at low temperatures, approximately 50° above their softening temperature.

The ABS slug 124 in the plunger is carried into the die wheel openings at a temperature of about 510° F. and injected through short sprue channels (.016 inch in diameter) into the recess 100 wherein the plastic temperature at injection was about 450° F., the die temperature proximate the recess being about 375° F. due to the proximity of the hotter plastic in the die openings 101. The temperature of the card or sheet 30*b* at the time of injection is momentarily raised by contact with heated plastic in order to soften the bonding surface thereof. At this time the pressure of the injected plastic is between 7,500 and 10,000 p.s.i. While the clamp remains in engagement with the sheet 30*b* it is rapidly cooled to drop the sheet temperature below 180° F. in order to prevent curling of the sheet. The time during which the injection pressure is applied to the plastic is controlled by a timer actuated by a signal from microswitch 157 (FIG. 14) The time duration of the application of injection pressure is approximately one second. After this timed delay, the plunger apparatus is then withdrawn from the die wheels and the plastic in the recesses and the sprue channels quickly cools to a stiffened state. The clamp body 76 is retracted and the cord 30*b* unflexed away from the die wheels to the position indicated in FIG. 10 to free the formed solid embossments and attached sprues from the die wheel recesses.

FIGS. 22–27 illustrate details of removal of card 30*e* from rotary table 50 at station 51 and their subsequent treatment. Means are provided to operate in timed relation with the conveyor movement to sever the tops of the embossments as well as the short sprues on successive sheets. Such means typically includes a rotary cutter indicated generally at 190, and carrier and holder structure 191 to transport sheets from the conveyor and to hold the sheets for presentation of embossments to the cutter. FIG. 25 illustrates sheet 30*e* being held and transported on carrier body 191*a*, with embossments 105*a* and their sprues 112 presented to rotary cutter 190, which severs the tops to define flat surfaces 185.

Although the embodiment disclosed herein has been described with reference to a rotary cutter, those skilled in the art will recognize that other cutting means, such as, for example, a serrated oscillating knife, may also be used to cut the tops of the characters. This may be necessary in many instances where the use of a rotating cutter would leave objectionable flash at the edges of the characters. It is therefore emphasized that the type of cutter and its mode of operation is not important to the basic aspects of this invention and the description herein is therefore not to be construed to be limited to merely the use of a rotating cutter in combination with the other elements of the apparatus and method.

More specifically, and as seen in FIGS. 22–24, carrier body 191*a* is moved by actuator rod 186 and 186*a* into underlying relation to the card 30*e* indexed by table 50 into the position shown. At that time, weight 187 spring-suspended at 188 urges holder 189 downwardly against the card, pressing the lower surface 190 thereof tightly against the flat top surface 191 of body 191*a*. The latter is perforated at 192 to communicate vacuum from line 193 to shallow narrow top channel 194 directly exposed to the card undersurface and extending transversely thereof. As a result, the card or sheet is held tightly by carrier body 191*a* as the latter is moved by rod 186 and guided by horizontal guideway 195. An actuator cylinder for rod 186 is indicated at 196.

During movement of the card 30*e* on the carrier and away from the rotary turntable, as indicated in FIG. 26, the card embossments 105*a* travel beneath and in top engagement with the rotary cutter 180 driven by suitable means indicated generally at 197. After removal of the embossment tops and sprues, the defined flat planar embossment surfaces 185 are brushed at 198, the brush being rotated by shaft 198*a*, to remove any burrs, whereby the embossment surfaces are made suitable for imprinting. Further leftward travel of the card on the carrier brings it against pick-up edges 200 of rails 201.

The carrier body continues leftward movement between the rails with the card held by suction as described; however, the suction is released when micro-switch 204 is tripped by carrier part 205 (FIG. 22), whereupon the card is released and continues to slide to the left on the rails, as it is pushed by succeeding cards, until it falls into hopper 16, where finished cards collect at 16*a* (FIG. 28). Carrier part 205 is seen in FIG. 22 as engaging microswitch 206 which causes application of suction to the body 182 at the time the card 30*e* is to be removed from the turntable by pulling free from the clips 66.

Those skilled in the art will recognize other modifications of the method and apparatus described above. While preferred embodiments of the invention have been shown and described, it will be apparent that changes may be made without departing from the principles and spirit of the invention, the scope of which is defined by the appended claims. Accordingly, the foregoing embodiments are to be considered illustrative only, rather than restrictive of the invention, and those modifications which come within the meaning and range of equivalency of the claims are to be included.

What we claim is:

1. Apparatus for providing embossments on a sheet, comprising:

- endless conveyor means for receiving and transporting individual sheets of material,
- at least one relatively movable die means for receiving heated plastic material and injecting the plastic material onto the sheet material to form embossments thereon,
- the movable die means including a plurality of recesses in the form of predetermined individual embossing characters,
- control means for moving the endless conveyor means to successively position predetermined portions of the sheet material in abutting relationship to the recesses,
- the control means serving to sequentially select individual ones of the plurality of individual recesses to receive heated plastic material in accordance with the desired embossment of the sheet material.

2. The apparatus according to claim 1 further comprising clamping means for securely positioning the selected individual ones of the plurality of recesses in direct abutment against the exposed surface of the sheet.

3. The apparatus according to claim 2 further comprising injection means for delivering heated plastic to selected ones of the plurality of recesses.

4. Apparatus according to claim 3 further comprising heat sink means for transferring heat through the sheet material and away from the plurality of recesses during and following an embossing operation.

5. Apparatus according to claim 4 further comprising cutter means operating in timed relation to the endless conveyor means for severing the tops of the embossments on successive sheets.

6. Apparatus according to claim 5 wherein the relatively movable die means include a wheel member supported on a rotatable shaft, the wheel member including the plurality of recesses in the form of predetermined embossing characters around its periphery, the recesses further including channels opening inwardly in the wheel member for receiving heated plastic from the injection means and transmitting heated plastic material to the recesses.

7. Apparatus according to claim 6 further comprising heating means for elevating the temperature of the plastic material prior to and during the embossing operation.

8. Apparatus according to claim 7 wherein the injection means includes plunger means for communicating with the channels to deliver heated plastic material to the recesses.

9. Apparatus according to claim 8 wherein the channels in the wheel member extend substantially parallel to the axis of the shaft for receiving the plunger means, the die recesses further including sprue channels for interconnecting the channels and the recesses.

10. Apparatus according to claim 9 wherein the plunger means includes an outer plunger having a side inlet to load heated plastic material into the interior of the outer plunger, and having a side outlet to transfer heated plastic material from the interior of the outer plunger into the sprue channels.

11. Apparatus according to claim 10 wherein the plunger means further includes an inner plunger movable lengthwise within the outer plunger to expel heated plastic material through the side outlet, and wherein the apparatus further comprises actuator means for inserting the outer plunger into the channels and for moving the inner plunger relative to the outer plunger.

12. Apparatus according to claim 11 wherein the plunger means further includes heating means for heating the plastic material prior to and during its delivery to the channels.

13. Apparatus according to claim 12 wherein the actuator means also serves to withdraw the plunger means from the channels subsequent to the insertion of the plunger means into the channels, whereby withdrawal of the plunger means from the channels interrupts the continuity of delivery of heated plastic material to the sprue channels.

14. Apparatus according to claim 13 wherein the clamping means includes a clamping member for exerting substantially uniform force on the sheet material, the clamping member engaging only a portion of the sheet material which portion projects free of the conveyor means.

15. Apparatus according to claim 14 wherein the clamping means further includes cooling means for cooling the sheet material surface for bonding the injected plastic material to the sheet surface.

16. Apparatus according to claim 15 wherein the cutter means is a rotary cutter and further comprising carrier and holder means for transporting the sheet material from the endless conveyor means to the rotary cutter.

17. Apparatus according to claim 16 wherein the carrier means includes a perforated body for receiving the sheet material and including suction means communicating with the perforated body for holding the sheet material in position on the body during the cutting of the sheet embossments by the cutter means.

18. Apparatus according to claim 16 wherein the endless conveyor means includes a circular table which is rotated in accordance with signals from the control means, the endless conveyor means further including a plurality of receiving stations mounted on the periphery of the table for receiving and positioning the sheet material.

19. Apparatus according to claim 18 wherein the table means rotates to position the sheet material successively at each movable die means for successively injecting the plastic material onto the sheet material.

20. Apparatus according to claim 19 wherein the relatively movable die means comprises at least one or more rotatable wheel members being positioned at successive locations around the periphery of the table means and wherein one of said wheel members includes a plurality of recesses in the form of alphabetical symbols and the other wheel member includes a plurality of recesses in the form of numerical symbols.

21. In apparatus for forming embossments on sheet material, the sub-combination comprising:

- rotatable die wheel means including peripheral recesses for receiving selective injection of heated plastic material,
- drive means for rotating the wheel in opposite directions,
- holding means for interrupting the wheel rotation in one direction when a selected recess is exposed to the sheet material and to release the wheel for rotation in the opposite direction, clutch means for decoupling the wheel from the drive in response to the interruption of the wheel rotation in the one direction and to couple the wheel to the drive in response to drive rotation in the opposite direction.

22. The apparatus according to claim 21 further comprising control means for providing drive control signals and responsive to a selected input to effect operation of the holding means.

23. Apparatus according to claim 22 wherein the die wheel includes circularly spaced openings respectively located inwardly of the recesses and communicating therewith to deliver the heated plastic material for injection into the recesses.

24. Apparatus according to claim 23 wherein the individual recesses each include lands projecting outwardly to penetrate the surface of the sheet material when a selected recess is exposed to the sheet material.

25. Apparatus according to claim 24 further comprising plunger means for injecting plastic material into the circularly spaced openings by a reciprocating movement into and out of the openings.

26. Apparatus according to claim 25 wherein the drive means includes a rotatable shaft on which the wheels are mounted for relative rotation in each of two directions, and wherein the holding means comprises a pivoted member rotatable to engage the wheel periphery to interrupt wheel rotation in one direction and counter-rotatable to disengage the wheel periphery to unblock wheel rotation in a reset direction.

27. Apparatus according to claim 26 further comprising control means for actuating the drive means, holding means and clutch means.

References Cited

UNITED STATES PATENTS

| | | | |
|---|---|---|---|
| 2,226,408 | 12/1940 | Nast. | |
| 2,298,365 | 10/1942 | Gits et al. | |
| 2,386,697 | 10/1945 | Lynch | 18—21X |
| 2,811,744 | 11/1957 | Baldanza | 18—30X |
| 3,086,245 | 4/1963 | Gits | 18—30X |
| 3,224,043 | 12/1965 | Lameris et al. | 18—21X |
| 3,302,592 | 2/1967 | Werner. | |
| 3,433,152 | 3/1969 | Mullen et al. | 18—44X |

CHARLES W. LANHAM, Primary Examiner

M. O. SUTTON, Assistant Examiner

U.S. Cl. X.R.

18—21, 42